April 14, 1964     H. C. SWIFT     3,128,847
AUTOMATIC BRAKE ADJUSTING MECHANISM Filed Aug. 22, 1962     3 Sheets-Sheet 1

INVENTOR.
Harvey C. Swift
BY
Harness, Dickey & Pierce
ATTORNEYS.

April 14, 1964     H. C. SWIFT     3,128,847
AUTOMATIC BRAKE ADJUSTING MECHANISM
Filed Aug. 22, 1962     3 Sheets-Sheet 2
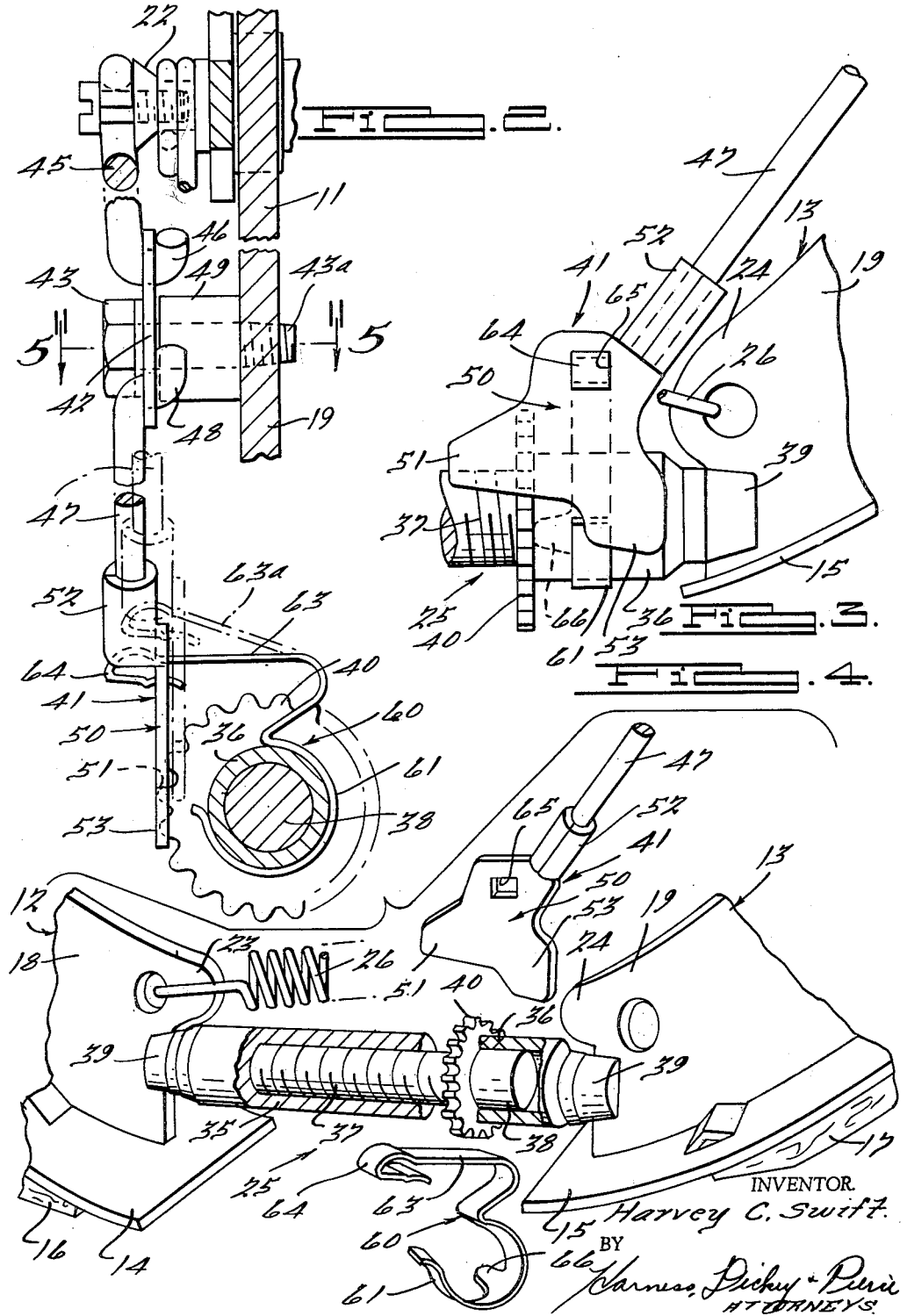
INVENTOR.
Harvey C. Swift
BY
Harness, Dickey & Pierce
ATTORNEYS April 14, 1964 H. C. SWIFT 3,128,847
AUTOMATIC BRAKE ADJUSTING MECHANISM
Filed Aug. 22, 1962 3 Sheets-Sheet 3
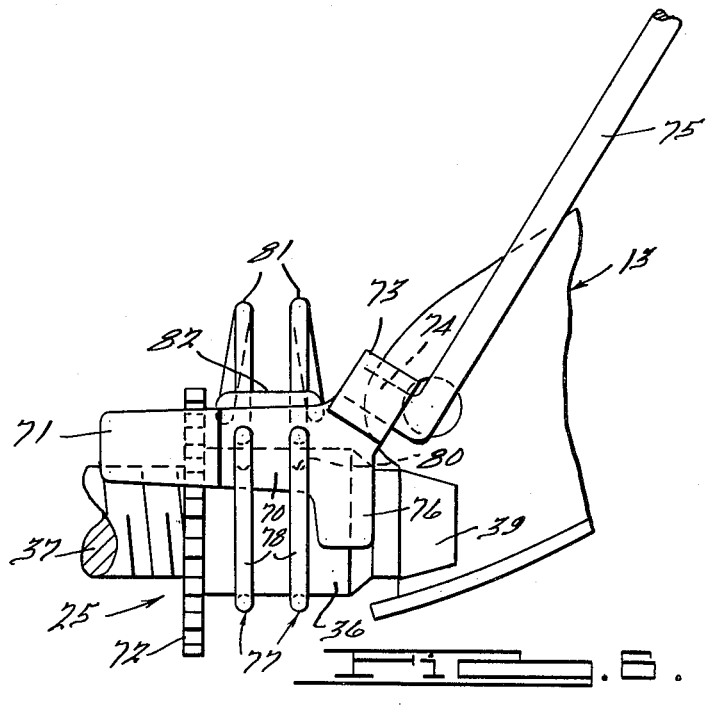
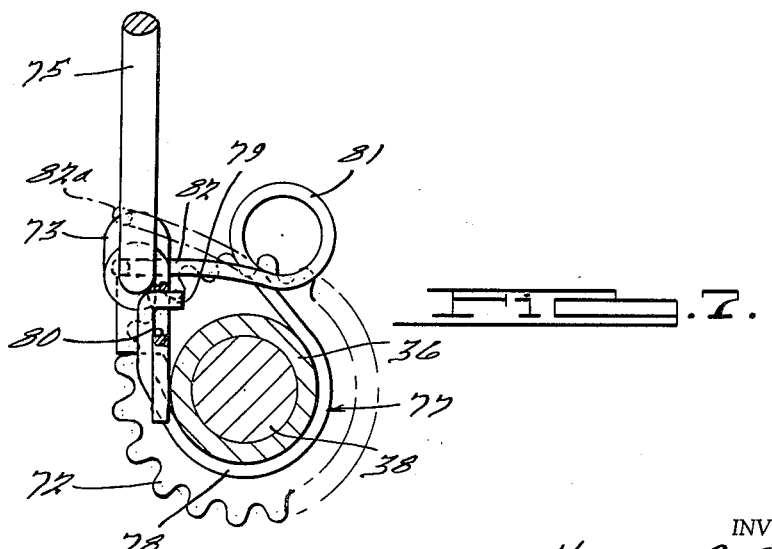
INVENTOR.
Harvey C. Swift
BY
Barnes, Dickey & Pierce
ATTORNEYS

# United States Patent Office 3,128,847
Patented Apr. 14, 1964

3,128,847
AUTOMATIC BRAKE ADJUSTING MECHANISM
Harvey C. Swift, Birmingham, Mich., assignor to Kelsey-Hayes Company, Romulus, Mich., a corporation of Delaware
Filed Aug. 22, 1962, Ser. No. 218,643
12 Claims. (Cl. 188—79.5)

This invention relates to brakes of the type comprising an annular brake drum and arcuate brake shoes and, more particularly, to means for automatically adjusting the brakes responsively to wear on the brake shoes thereof.

A principal object of this invention is to provide an automatic adjuster for the brake shoes which is so reduced in the number and character of its component parts as to approach the practical limits of structure simplicity.

Another object of the invention is to provide a device of this type wherein the structural simplicity of the brake adjusting means produces a substantial economy in its manufacturing, installation and maintenance costs.

It is also an object of the invention to provide an automatic adjuster of this type which may also be manually adjusted so that the adjuster can be manually reset to accommodate replacement shoes.

It is also an object of the invention to provide an adjuster of this type in which the structure comprises a minimum number of stampings and other simple parts which may be economically manufactured and easily assembled. Furthermore, the adjuster is so constructed that it may be installed on a brake which was not originally adapted for the invention.

A further object of the invention is to provide automatic adjusting means of this type which is rendered operative only when the vehicle is moving in a reverse direction and which does not interfere with the normal operation of the brake during the forward movement of the vehicle.

The various objects and advantages, and the novel details of construction of two commercially practical embodiments of the invention, will become more apparent as this description proceeds, especially when considered in connection with the accompanying drawings, in which:

FIGURE 2 is an enlarged vertical sectional elevational view, partly broken away, taken substantially on the plane indicated by line 2—2 in FIGURE 1;

FIGURE 3 is an enlarged fragmentary elevational view of the adjusting mechanism;

FIGURE 4 is a detail separated perspective view of a portion of the adjusting mechanism;

FIGURE 6 is a view similar to FIGURE 3 showing a modified form of construction; and FIGURE 7 is a view of the structure shown in FIGURE 6 as seen from the right in FIGURE 6.

Figure 1:
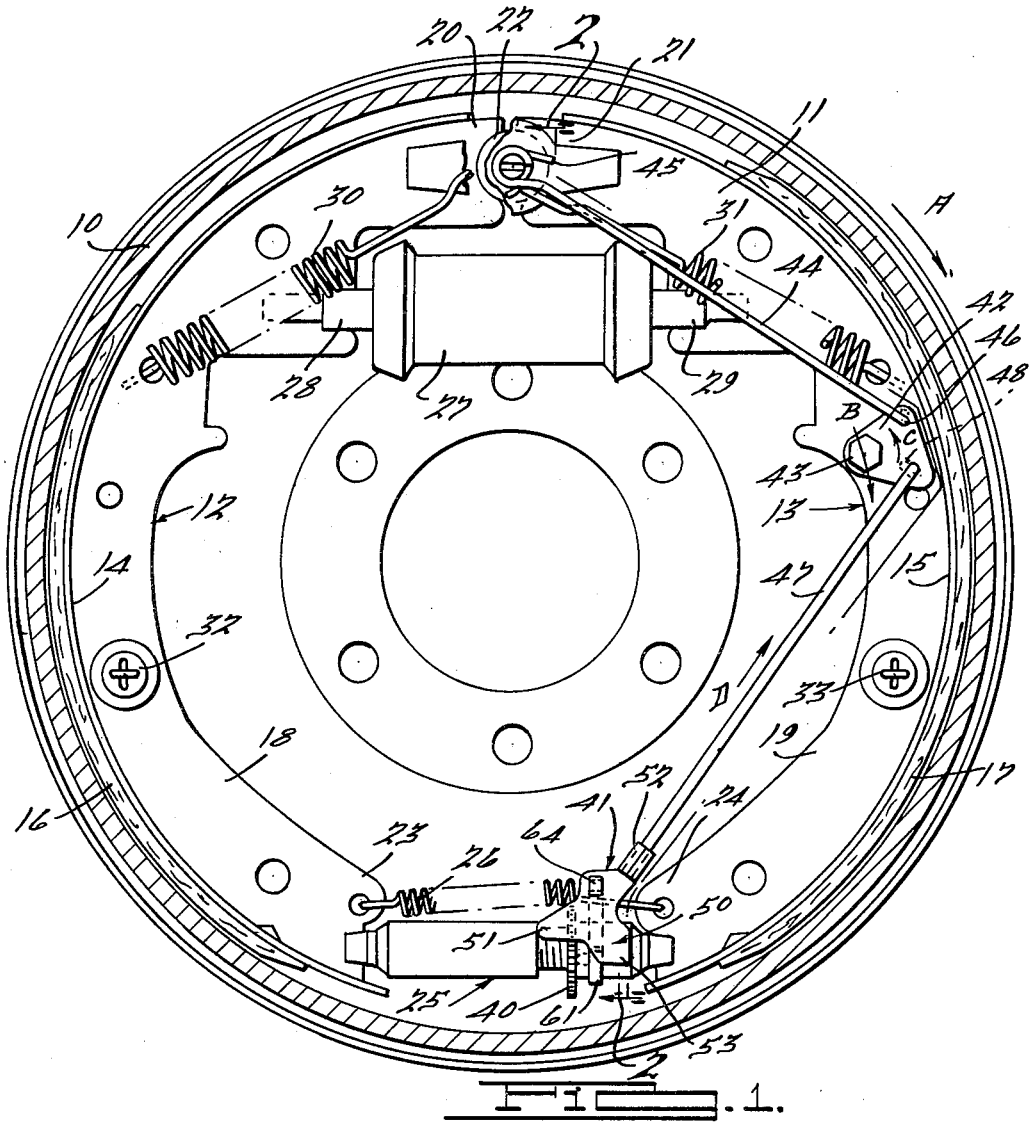
FIGURE 1 is a plan view of a brake assembly showing one embodiment of the invention.

The illustrative embodiment of the invention is shown in the drawings as applied to a brake structure of the internal expanding type comprising arcuate brake shoes adapted to cooperate with the inner surfaces of the brake drum. In FIGURE 1, the reference character 10 indicates a brake drum mounted on the wheel hub of the vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15.

The adjacent ends 20 and 21 of the brake shoes 12 and 13 engage an anchor pin 22 fixed to the backing plate 11. The opposite adjacent ends 23 and 24 of the brake shoes 12 and 13 engage an adjusting strut 25, with the shoe ends 23 and 24 being retained in engagement with the adjusting strut by means of a tension spring 26.

A hydraulic wheel cylinder 27 having plunger members 28 and 29 extending from opposite ends thereof into engagement with the webs 18 and 19 provides the actuating device for moving the brake shoes 12 and 13 into engagement with the brake drum 10. The plunger members 28 and 29 extend from piston members (not shown) within the wheel cylinder 27, hydraulic fluid being delivered into the wheel cylinder between the piston members from a conventional pedal operated master cylinder (not shown). Retraction springs 30 and 31 normally retain the ends 20 and 21 of the brake shoes in engagement with the anchor pin 22 when hydraulic pressure is released from the wheel cylinder 27. The brake shoes 12 and 13 are resiliently urged into engagement with the backing plate 11 by conventional spring assemblies 32 and 33.

In the type of brake thus far described, it will be understood that the brake shoe 13 constitutes the secondary shoe and that this shoe moves away from the anchor pin 22 when the brake is applied while the vehicle is moving in reverse and the brake drum is moving in the direction of arrow A in FIGURE 1. As will be explained more fully hereinafter, the means for adjusting the brake shoes is initially operated or set only when the brake is applied while the vehicle is moving in a reverse direction.

The adjustable strut for adjusting the brake shoes, indicated generally by the reference character 25, comprises a tubular internally threaded nut 35 and a socket 36 which receives the threaded stem 37 and the nonthreaded stem 38, respectively, of the adjusting portion of the strut. The ends 39 of the nut 35 and the socket 36 are slotted to receive the ends 23 and 24 of the webs of the brake shoes, thus preventing rotation of the nut 35 and the socket 36. A toothed wheel 40 is formed integrally with the stems 37 and 38, and the teeth of this toothed wheel provide a ratchet surface for turning the toothed wheel 40.

The structure thus far described is substantially conventional in modern-day brakes, and the present invention relates to means for adjusting the adjusting strut 25, which is so reduced in the number and character of its component parts as to approach the ultimate in structural simplicity.

The adjusting member indicated generally by the reference character 41 is actuated by a mechanism carried by the secondary shoe 13 which comprises a bellcrank lever 42 in the form of a flat plate pivotally connected to the web 19 of the brake shoe 13, as at 43. A rod 44 has a hooked end 45 which engages the anchor 22, and the other end of this rod 44 has a hooked end 46 which engages an aperture in the bellcrank lever 42. Also connected to the bellcrank lever 42 is a second rod 47 which has a hooked end 48 engaging an aperture in the bellcrank lever 42.

Figure 5:
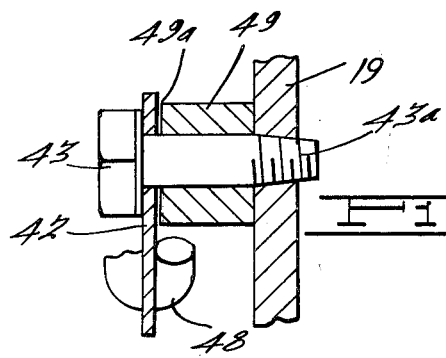
FIGURE 5 is a detail sectional view showing the pivot for the bellcrank, taken on line 5—5 in FIGURE 2.

A simple way for conveniently mounting the bellcrank 42 on the web 19 of the brake shoe 13 consists in forming the pivot 43 of a self-tapping screw having a threaded portion 43a engaging the brake shoe web 19. Pressed on the screw is a spacer sleeve 49 which abuts the backing web 19 and is spaced from the bellcrank 42 to provide a clearance 49a so that the bellcrank may oscillate freely; see particularly FIGURE 5.

When the brakes are applied and the vehicle is moving in a reverse direction, the brake shoe 13 moves away from the anchor pin 22 to move the pivot 43 in the direction of arrow B. This will rock the bellcrank 42 in the direction of arrow C to move the link or second rod 47 in the direction of arrow D to move the adjusting member in an upward direction, as viewed in FIGURE 1, to cause a detent carried thereby to engage a successive portion of the toothed wheel 40 to thereby position the adjusting member for subsequent rotation of the toothed wheel 40.

The adjusting member consists of a plate member 50 having a detent portion 51 adapted to engage the teeth of the toothed wheel 40. The plate member 50 of the adjusting member is provided with a sleeve portion 52 adapted to be crimped around the end of the second rod 47 to secure these parts together. The plate 50 of the adjusting member is also provided with a leg portion 53 adapted to engage and ride on the rim portion 15 of the brake shoe in the event the adjusting member becomes accidentally disconnected from the adjusting strut 25.

A simple but expedient means for holding the adjusting member 41 in operative relation to the toothed wheel 40 and for urging the same in one direction consists of a spring device 60 having a semicircular resilient portion 61 adapted to substantially surround and embrace the socket portion 36 of the adjustable strut 25. Thus, the spring device 60 may be snapped into engagement with this portion of the adjustable strut as shown most clearly in FIGURE 2.

The spring device consists of a spring arm 63 extending from the semicircular portion 61 and terminating in a resilient return-bent portion 64 constituting a spring clip adapted to be snapped into and received in an aperture 65 in the adjusting member 41.

The spring device 60 is provided with a lip or projection 66 which extends laterally therefrom and is adapted to engage the side of the toothed wheel 40 to properly locate the spring device 60 on the adjustable strut 25.

When the rod or link 47 is moved in the direction of the arrow D (FIGURE 1) upon application of the brakes while the vehicle is moving in a reverse direction, the spring arm 63 will be moved from its full-line position to its dotted-line position indicated at 63a, as shown in FIGURE 2, to thus load the spring device. This loaded spring serves to urge the adjusting member 41 and the detent 51 to their original positions to thereby adjustably rotate the toothed wheel 40 when the brake is released and the secondary shoe is retracted to the position in which it engages the anchor 22. This rotates the toothed wheel 40 and this rotation will extend the strut member 25 to adjust both brake shoes outwardly toward the brake drum.

The loading of the spring arm 63 is independent of the movement of the brake shoes so that the loading of this spring does not affect the pedal pressure required to apply the brakes.

In the modification shown in FIGURES 6 and 7, the adjusting member consists of a plate member 70 having a detent portion 71 adapted to engage the teeth of the toothed wheel 72. The adjusting member 70 is provided with a sleeve portion 73 adapted to be crimped around the angularly extending end 74 of the second rod 75 of the mechanism carried by the second shoe. The adjusting member 70 is provided with a leg portion 76 adapted to engage and ride on the rim portion of the brake shoe in the event the adjusting member becomes accidentally disconnected from the adjusting strut.

The means for holding the adjusting member 70 in operative position on the toothed wheel 72 and for urging the same in one direction consists of a spring device indicated generally by the reference character 77. The spring device 77 is made out of wire and consists of a pair of resilient semicircular portions 78 forming spring clip mounting portions adapted to substantially surround and embrace the socket portion 36 of the adjustable strut 25.

Thus, the spring device 77 may be snapped into engagement with this portion of the adjustable strut, as shown in FIGURE 7. At one end, the semicircular portions 78 terminate in laterally-extending ends 79 adapted to engage a pair of slots 80 formed in the adjusting member 70. The other ends of the spring device 77 are provided with spring loops 81 terminating in a substantially horizontally-extending U-shape loop portion 82 which rests upon and engages the top edge of the adjusting member 70. This loop portion 82 joins the two halves of the spring member and forms a spring arm adapted to bear upon the adjusting member 70.

When the rod or link 47 moves in the direction of the arrow D (FIGURE 1) upon application of the brakes while the vehicle is moving in a reverse direction, the spring arm 82 will be moved from its full-line position to its dotted-line position indicated at 82a, as shown in FIGURE 7, to thus load the spring device. This loaded spring serves to urge the adjusting member 70 and the detent 71 to their original positions to thereby adjustably rotate the toothed wheel 72 when the brake is released and the secondary shoe is retracted to the position in which it engages the anchor 22. This rotates the toothed wheel 72 and this rotation will extend the strut member 25 to adjust both brake shoes outwardly toward the brake drum, as described in connection with the first form of the invention.

From the construction heretofore described, it will be apparent that the spring device 77 provides means for holding the adjusting member 70 in operative relation with the toothed wheel 72 and also for urging the adjusting member in one direction.

It will be understood in connection with both forms of construction that the movement of the rods 47 and 75 in the direction opposite to that indicated by arrow D in FIGURE 1 also tends to move the adjusting member 70 in the direction to adjust the toothed wheel.

It will be apparent from the above description of the device that an automatic adjuster is provided which is so reduced in the number and character of its component parts as to approach the practical limits of structural simplicity. Also, the device comprises a minimum number of simple parts whereby it may be manufactured, installed and maintained at a minimum cost.

While two commercially practical embodiments of the invention have been described and illustrated herein somewhat in detail, it will be understood that various other changes may be made as may come within the purview of the accompanying claims.

What is claimed is:

1. In a brake mechanism comprising first and second brake shoes, a brake drum, an anchor, means for moving said brake shoes away from said anchor and into engagement with said brake drum, an extensible strut connecting adjacent ends of said shoes, and a rotatable toothed wheel which controls the extension of said strut, that improvement which comprises, an adjusting member having means to engage said toothed wheel to rotate the same, a spring device mounted on said strut and engaging said adjusting member, said spring device having a substantially semicircular resilient portion adapted to be snapped into engagement with said strut to secure said spring device thereto, and means translating brake applying movement of one shoe into movement of said adjusting member in one direction to engage a successive portion of said toothed wheel and to load said spring device, said spring device, when loaded, serving to urge said adjusting member to its original position to thereby adjustably rotate said toothed wheel when the brake is released and said shoe is retracted.

2. In a brake mechanism comprising first and second brake shoes, a brake drum, an anchor, means for moving said brake shoes away from said anchor and into engagement with said braked drum, an extensible strut connecting adjacent ends of said shoes, and a rotatable toothed wheel which controls the extension of said strut, that improvement which comprises, an adjusting member having means to engage said toothed wheel to rotate the same, a spring device mounted on said strut and engaging said adjusting member, said spring device having a semicircular resilient portion adapted to be snapped into embracing engagement with said strut to secure said spring device thereto, and operating means for said adjusting member mounted on said second shoe and connected to said anchor whereby movement of said shoe into brake applying position moves said adjusting member in one direction to engage a successive portion of said toothed wheel and loads said spring device, whereupon said spring device serves to urge said adjusting member to its original position to thereby adjustably rotate said toothed wheel when the brake is released and said shoe is retracted.

3. A brake mechanism comprising, a pair of brake shoes operatively connected to a fixed anchor at one end, an automatic adjuster for said shoes comprising an extensible strut interconnecting the unanchored ends of said brake shoes, a rotatable toothed wheel operatively associated with said extensible strut to control the extension thereof, a bellcrank pivotally mounted on one of said shoes, means connecting one end of said bellcrank to said anchor, a rod connected to the other end of said bellcrank and extending to adjacent said toothed wheel, an adjusting member on said rod having a detent adapted to engage said toothed wheel to rotate the same, and a spring device secured to said strut and connected to said adjusting member, said spring device having a semicircular resilient portion snapped into engagement with said strut to secure said spring device thereto, said spring device serving to hold said adjusting member in operative relation to said toothed wheel and when loaded to move said detent in one direction, whereby movement of said shoe away from its anchored position produces a rotation of said bellcrank and a movement of said adjusting member to cause said detent to engage a successive portion of said toothed wheel and to load said spring device, whereupon said spring device serves to urge said adjusting member and detent to their original position to thereby adjustably rotate said toothed wheel when the brake is released and said shoe is retracted.

4. A device as described in claim 1 in which said spring device comprises a spring clip portion engaging an aperture in said adjusting member.

5. A device as described in claim 1 in which said spring device comprises a spring arm extending from said semicircular portion and a resilient compressible spring clip portion on the end of said spring arm adapted to be inserted into an aperture in said adjusting member and to be retained therein by reason of its inherent resiliency.

6. A device as described in claim 3 in which said rod is rigidly connected to said adjusting member by means of a sleeve on said adjusting member which is crimped around the end of said rod.

7. A device as described in claim 1 in which said adjusting member is provided with a leg portion adapted to engage the rim of the brake shoe in the event said adjusting member becomes accidentally disconnected from said toothed wheel.

8. A device as described in claim 3 in which said bellcrank is mounted on the secondary shoe whereby said adjusting member is moved to engage a successive portion of the toothed wheel and to load said spring device during the application of the brakes while the vehicle is moving in a reverse direction.

9. A device as described in claim 3 in which the means for connecting one end of the bellcrank to the anchor comprises a rod having an eye formed on the end of said rod engaging said anchor.

10. A device as described in claim 3 in which the pivot for the bellcrank comprises a headed stud, a spacer sleeve pressed on said stud in spaced relation to said head to provide clearance for the bellcrank mounted thereon, the end of said stud having a threaded portion engaging the web of the brake shoe.

11. A device as described in claim 1 in which said spring device comprises a wire member having mounting portions adapted to embrace said strut and end portions engaging in slots in said adjusting member, the other ends of said mounting portions being provided with spring loops terminating in a portion providing a spring arm engaging said adjusting member.

12. A device as described in claim 1 in which said spring device comprises a wire member having a pair of substantially semicircular portions defining spring clips adapted to be engaged with said strut and terminating in end portions engaging in slots in said adjusting member, the other ends of said spring clips being provided with spring loops terminating in a portion connecting said pair of spring clips and forming a spring arm engaging said adjusting member.

References Cited in the file of this patent

UNITED STATES PATENTS

| | | |
|---|---|---|
| 2,060,429 | Smith | Nov. 10, 1936 |
| 2,938,610 | Dombeck et al. | May 31, 1960 |
| 2,978,072 | Burnett | Apr. 4, 1961 |